A. R. BRADSHAW.
GRADOMETER.
APPLICATION FILED SEPT. 8, 1913.

1,193,758.

Patented Aug. 8, 1916.

Witnesses
Wm H. Mulligan.
C. H. Crawford

Inventor
Adelbert R. Bradshaw

Richard Bowen,
his Attorney

UNITED STATES PATENT OFFICE.

ADELBERT R. BRADSHAW, OF VISALIA, CALIFORNIA.

GRADOMETER.

1,193,758.  Specification of Letters Patent.  Patented Aug. 8, 1916.

Application filed September 8, 1913. Serial No. 788,572.

*To all whom it may concern:*

Be it known that I, ADELBERT R. BRADSHAW, a citizen of the United States, residing at Visalia, in the county of Tulare and State of California, have invented certain new and useful Improvements in Gradometers, of which the following is a specification.

The object of this invention is to provide an instrument for attachment to the dash board or a like part of a vehicle which is capable of indicating a grade percentage along which the vehicle is ascending or descending, and which, in the most improved embodiment, also provides for indicating the points of compass so that the driver will not only be informed as to grade or incline but also the direction in which he is traveling.

It is one of the objects of this invention to combine instruments capable of giving such indications so as to facilitate the reading thereof, irrespective of the inclination which the vehicle may assume in traveling over hilly country.

A further novel feature consists in an improved construction of a gradometer whereby the same will indicate varying grade percentage and will automatically return to zero when the vehicle reaches a level road bed.

Other features and objects of the invention will be more fully described in connection with the accompanying drawing and will be more particularly pointed out in and by the appended claim.

Figure 1:
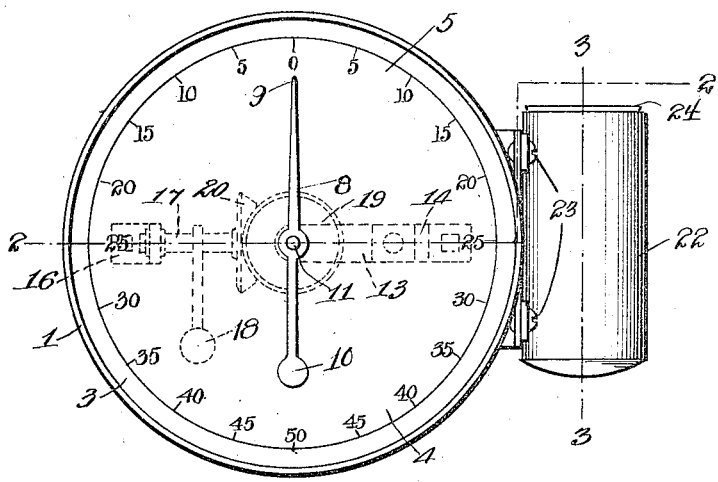
Figure 2:
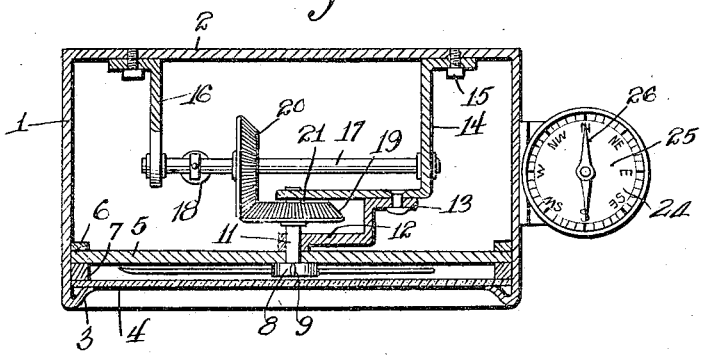
Figure 3:
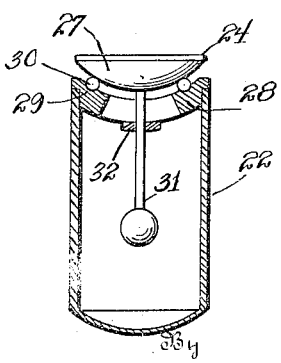

In the drawing: Figure 1, is a front elevation illustrative of one form of my invention. Fig. 2, is a sectional view on line 2—2 of Fig. 1. Fig. 3, is a sectional view on line 3—3 of Fig. 1.

Like characters of reference designate similar parts throughout the different figures of the drawing.

In the form shown, I have provided a casing 1, adapted to be secured to the dash board of a carriage or to any fixed part of an automobile or like vehicle, in any desirable manner. The rear part 2, in the present construction, is adapted for such attachment.

The margins 3, of the casing 1, are bent inwardly to form a seat against which a glass 4, may be supported. Within the casing I mount a dial 5, as at 6, and provide a suitable spacing ring 7, between the glass and the dial to hold the same in proper spaced relation. An index 8, is provided with an indicating end 9, and a counter balancing end 10, and is mounted upon an index shaft 11, in such a manner as to afford a gradometer reading on the dial 5. The dial 5, is preferably graduated to indicate grades during descent or ascent thereof, there being provided numerals of increasing grade indications in opposite directions from zero. The index shaft 11, is journaled in a bearing 12, formed on a bracket 13. A bracket 14, supports the bracket 13, and is secured at 15, to the casing 1. Another bracket 16, is mounted on the casing and journals are provided in the brackets 14 and 16, for a pendulum shaft 17. The pendulum shaft 17, carries a pendulum 18, and the latter is rigidly mounted on said shaft. The index shaft 11, is operatively connected with the pendulum shaft by means which may comprise bevel gears 19 and 20. The bevel gear 19, is disposed between bearing 12, and bearing 21, of the index shaft 11.

The casing 1, is fixedly mounted in such a manner as to dispose the dial 5, in a substantially vertical position, and at one side of the casing 1, or to one portion of the periphery thereof, I fixedly mount a compass casing or support 22, which is secured to the casing 1, at 23. A compass is indicated at 24, and may comprise a dial 25, and an index 26, of any approved construction. The compass is provided with a casing 27, which is rounded on its lower face on a radius having its center above the compass. The compass support 22, is provided with an upper wall 28, having upper and lower faces curved concentrically with respect to the casing curvature 27. The upper face of the wall 28, is preferably annularly grooved, as indicated at 29, to form a race way in which anti-friction elements such as balls 30, may be disposed. The compass rests on the balls 30, so as to tilt in any direction toward the horizontal, which will be its normal position. The compass is preferably controlled by a pendulum 31, on the stem of which a retainer 32, is mounted in the form of a washer and which serves to engage the lower concentric face of the wall 28, to retain the compass 27 on its anti-friction mounting but in concentric relation with the wall 28. It will thus be seen that if the vehicle is descending a grade, the pendulum 31, will swing forwardly so as to tilt the compass into a convenient reading position with respect to the occupant of the seat nearest the mounting of the device. Conversely ascent of a grade would serve to tilt the pendulum rearwardly so that in either position of the vehicle, the compass face would occupy a horizontal position.

The pendulum 18, will always seek a vertical position irrespective of the inclination of the casing 1, during an ascending or descending travel of the vehicle, and relative movement of the casing 1, with respect to the pendulum 18, will cause rotation of the gears and index 8, to afford a reading on the dial 5, indicating the extent of the grade incline.

It will thus be seen that I have provided in a unitary structure, two instruments having great utility when traveling in a vehicle through country regions and that the devices are so disposed that a reading of either is always possible without necessitating any discomfort on the part of the driver.

From the foregoing it is believed that the advantages and utilities of my invention will be clear and while I have herein shown and described one specific form of my invention I do not wish to be limited thereto except for such limitations as the claim may import.

I claim:

In a gradometer for vehicles, a cylindrical casing to be rigidly attached to a fixed portion of the vehicle with its central axis extending in line with the direction of travel of the vehicle, a circular dial mounted in the forward part of the casing and provided with a central opening, a pair of brackets mounted on the rear wall of the casing and one of said brackets provided with an offset positioned the end of which is opposite the opening of the dial, a second bracket carried by said offset, an index shaft mounted in the offset and the bracket carried thereby and having its forward end extended through said dial, a pendulum shaft mounted in the brackets carried by the casing to extend at right angles to and adjacent the inner end of the index shaft, an index hand carried by the forward end of the index shaft to work adjacent the dial, a pendulum carried by the pendulum shaft and depending therefrom to cause turning movement of said shaft as the vehicle varies its incline, a beveled gear carried by the index shaft, and a second beveled gear mounted on the pendulum shaft to mesh with said first gear to transmit movement from the pendulum to the index hand.

In testimony whereof I affix my signature in presence of two witnesses.

ADELBERT R. BRADSHAW.

Witnesses:
L. WATSON,
S. I. BORING.